United States Patent [19]

Fujii

[11] Patent Number: 4,775,603

[45] Date of Patent: Oct. 4, 1988

[54] OPTICAL-MAGNETIC RECORDING MEDIUM

[75] Inventor: Seiro Fujii, Saitama, Japan

[73] Assignee: Pioneer Electronic Corporation, Tokyo, Japan

[21] Appl. No.: 67,029

[22] Filed: Jun. 29, 1987

[30] Foreign Application Priority Data

Jun. 28, 1986 [JP] Japan .................. 61-152543

[51] Int. Cl.$^4$ .............................. G11B 7/24
[52] U.S. Cl. .................. 428/694; 428/696; 428/697; 428/698; 428/704; 428/900
[58] Field of Search ............. 428/689, 694, 696, 698, 428/900, 697, 704; 365/122; 360/131, 134, 135; 369/13, 288; 430/945

[56] References Cited

U.S. PATENT DOCUMENTS

| 3,883,214 | 3/1975 | Hoffman | 428/696 |
| 3,934,961 | 1/1976 | Itoh et al. | 428/696 |
| 4,370,391 | 1/1983 | Mori et al. | 428/698 |
| 4,450,201 | 5/1984 | Brill et al. | 428/696 |
| 4,499,178 | 2/1985 | Wada et al. | 428/689 |
| 4,649,451 | 3/1987 | Tomita | 360/131 |

FOREIGN PATENT DOCUMENTS

| 2558003 | 7/1985 | France . |
| 185052 | 10/1984 | Japan . |
| 2164269 | 3/1986 | United Kingdom . |

Primary Examiner—George F. Lesmes
Assistant Examiner—William M. Atkinson
Attorney, Agent, or Firm—Sughrue, Mion, Zinn, Macpeak & Seas

[57] ABSTRACT

An optical-magnetic recording medium utilizing a recording layer of an amorphous rare-earth-transition metal alloy so as to rely on the Kerr effect. An enhancing layer of ZnS and a fluoride of an alkaline-earth metal (preferably $CaF_2$) is deposited on a grooved substrate and the recording layer deposited thereover to both enhance the Kerr effect and prevent peeling.

8 Claims, 2 Drawing Sheets

OPTICAL-MAGNETIC RECORDING MEDIUM

BACKGROUND OF THE INVENTION

1. Field of the Invention

The present invention relates to an optical-magnetic recording medium. More specifically, the present invention relates to an optical-magnetic recording medium utilizing an amorphous alloy having, as a main component, an alloy of a rare-earth metal and a transition metal and having a single axis anisotropy perpendicular to the surface of the recording layer.

2. Background of the Invention

FIGS. 1A and 1B are sectional views showing the structure of two kinds of the conventional optical-magnetic recording medium. In the conventional optical-magnetic medium shown in FIG. 1A, an enhancing layer 2 made of ZnS is formed on a substrate 1 of PMMA (polymethyl methacrylate). An amorphous alloy layer 3 is provided on the enhancing layer 2. A protection film 4 made of $CaF_2$ is formed on the amorphous layer 3 to cover all the surface of the layer 3.

On the other hand, in the optical-magnetic medium shown in FIG. 1B, a protective layer 4 of $CaF_2$ is formed on the substrate 1. An amorphous alloy layer 3 is provided on the protective layer 4. Another protective layer 4 of $CaF_2$ is further formed on the amorphous layer 3 to cover the latter.

The above-described conventional optical-magnetic recording medium utilizes for the amorphous alloy layer the amorphous structure of an alloy which is made of a rare-earth metal and a transition metal in a predetermined condition and which has a single-axis anisotropy perpendicular to the surface of the layer. A laser beam is focused at a portion on the optical-magnetic medium having the amorphous layer 3, to thereby heat the portion to a temperature which is close to the Curie temperature or the compensation temperature of the material in the amorphous layer 3. As a result, due to thermal effects, in the amorphous layer 3 magnetized in one direction, there is formed a spot having a magnetization direction opposite to the magnetization direction. The spot is called a magnetization inversion spot.

A polarized light beam is applied to the layer to detect rotation of the main axis of the elliptical polarization of the beam or the change of the elliptical ratio of the circular polarization which are caused to occur due to the Faraday effect or the Kerr effect. As a result, whether the magnetization inversion spot exists or not is detected as a signal.

The above-described layer is used as a magnetic recording medium in such a manner that the signal "1" corresponds to the case where the magnetization inversion spot exists, and the signal "0" corresponds to the case where the magnetization inversion spot does not exist. In order to increase the above-described effects, there is provided a layer made of ZnS as the enhancing layer 2 between the substrate 1 and the perpendicularly magnetized layer 3.

The above-described conventional amorphous alloy made of the rare-earth metal and the transition metal attracts the attention of the persons in the art as an optical-magnetic material since the optical-magnetic effect, the magnetic property, the Curie temperature and the compensation temperature attained by the amorphous alloy is very suitable for optical-magnetic recording material.

In accordance with the application of the amorphous alloy to the optical-magnetic recording material, an enhancing layer 2 for increasing the Kerr rotation angle and a protective layer 4 for avoiding oxidization of the optical-magnetic medium are proposed. The enhancing layer 2 such as a layer made of ZnS can achieve a remarkable enhancing effect, as follows: The incident beam entered in the medium through the substrate 1 is reflected at an interface between the enhancing layer 2 and the amorphous layer 3 with rotating by a Kerr rotation angle. However, in the case where the enhancing layer 2 is provided between the amorphous layer 3 and the substrate 1 as shown in FIG. 1A, the reflected beam directed to the substrate 1 is further reflected at the interface between the enhancing layer 2 and the substrate 1, unlike in the medium without an enhancing layer. Therefore, the beam is again directed to the amorphous layer 3, and, at the interface between the layers 2 and 3, the beam is again reflected and further rotated by a Kerr rotation angle. On the other hand, in the medium without the enhancing layer, the beam is reflected at the recording layer 3 only once. Therefore, according to the medium with the enhancing layer, the beam reflected at the recording layer 3 is rotated by an angle greater than the angle by which the beam is rotated in the medium without the enhancing layer.

However, there have not yet been found a suitable substrate having a good adhesion or sticking property to the enhancing layer 2. Therefore, the optical-magnetic medium having the enhancing layer 2 made of ZnS has problems that the layers are liable to be peeled 2 and 3 from one another and are liable to be broken.

On the other hand, the protective film 4 made of $MgF_2$ or $CaF_2$ has a good adhesion or sticking property. However, the protective film has a problem that it disorients the single axis anisotropy perpendicular to the surface of the amorphous layer. As explained above, there have not yet been found the material suitable for the enhancing film and the material suitable for the protective film.

SUMMARY OF THE INVENTION

An object of the present invention is to solve the above-mentioned problems of the conventional optical-magnetic recording medium.

According to the present invention, in order to achieve the above object, an enhancing film is simultaneously formed from ZnS and fluoride of the alkaline-earth metal.

DETAILED DESCRIPTION OF THE PREFERRED EMBODIMENTS

Figure 2:
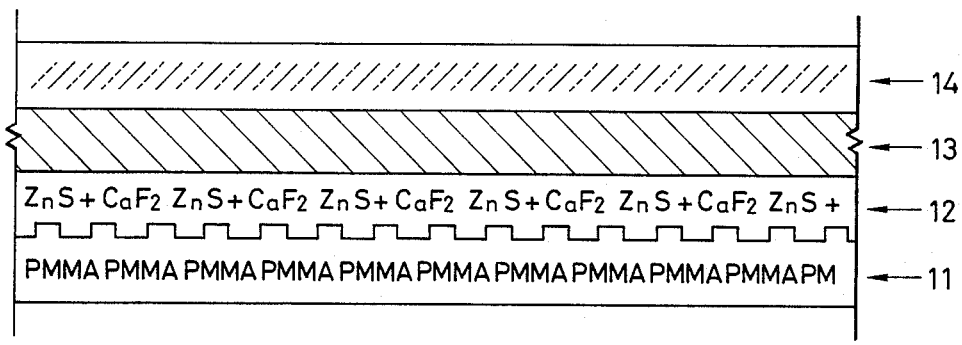
FIG. 2 is an enlarged sectional view showing an optical-magnetic recording medium of the present invention.
Figure 3:
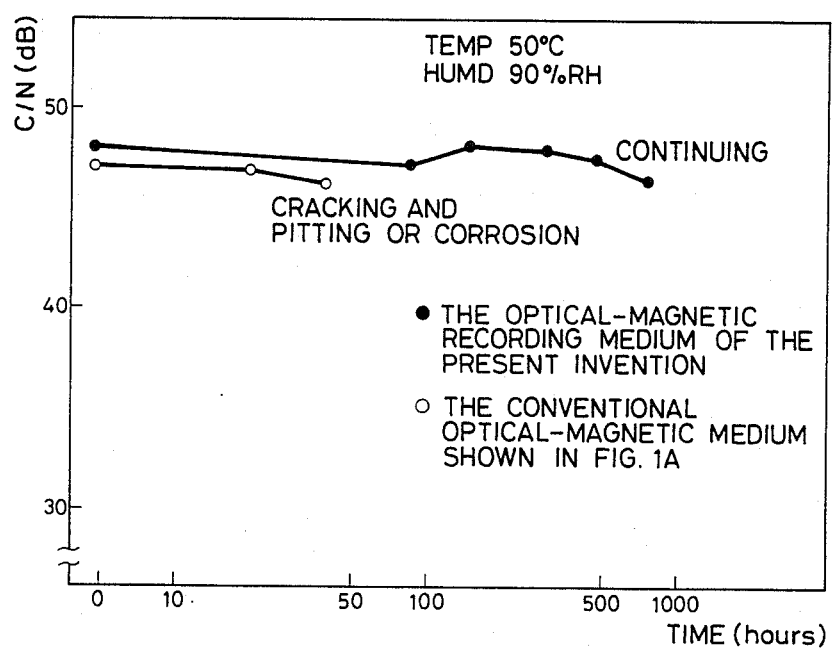
FIG. 3 is a graph for showing how the C/N of the optical-magnetic recording medium of the present invention changes as time passes.

With reference to the accompanying drawings, FIGS. 2 and 3, preferred embodiments of the present invention will hereinafter be described in greater detail.

An enhancing film 12 made of ZnS and $CaF_2$ is formed on one side of a PMMA substrate 11 having a guide groove. The thickness of the enhancing film 12 is 100 nm. The atomic ratio between the ZnS and the CaF$_2$ is 3:1. An amorphous alloy layer 13 is formed on the enhancing layer 12. A protective film 14 is provided on the amorphous alloy layer 13 to cover the surface of the layer 13. The above-described layers are formed through a sputtering evaporation method or a spin coating method.

The enhancing film 12 made of ZnS and CaF$_2$ produces a large amount of the Kerr rotation angle. Furthermore, it can reliably prevent the optical-magnetic recording medium from being broken down or being peeled off.

In the above-described first embodiment, the enhancing film is made of ZnS and CaF$_2$. However, as the material for forming the enhancing film 12 together with the ZnS, a fluoride of an alkaline-earth metal other than the Ca is applicable. Furthermore, the film made of ZnS and the fluoride made of alkaline-earth metal may be provided on the amorphous alloy film as a protective film, rather than as the enhancing film.

Figure 1A:
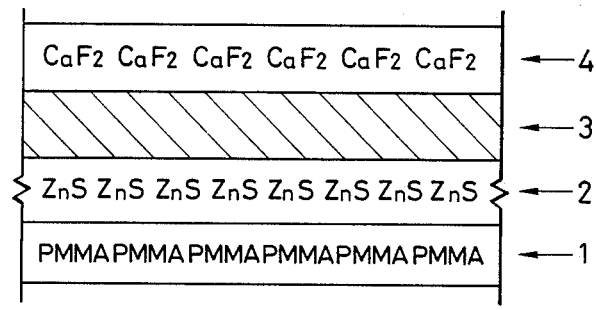
FIGS. 1A and 1B are enlarged sectional views showing conventional optical-magnetic recording medium.
Figure 1B:
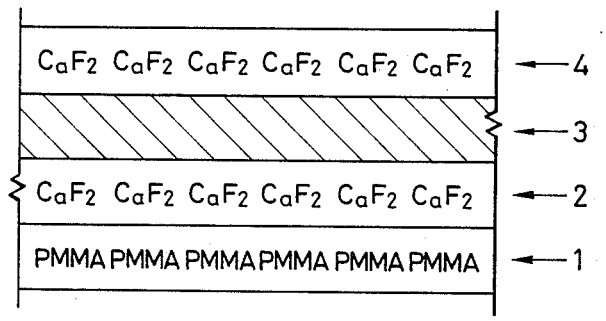

An experiment was conducted to compare the optical-magnetic recording medium of the present invention with the conventional media shown in FIG. 1A (labeled A) and in FIG. 1B (labeled B), in regards to their Kerr rotational angles $\theta_k$, their peeling resistance property and their C/N ratio. Table 1 shows the results of the experiment. The inventive sample and conventional sample B had satisfactory peeling resistance (marked by circles) while the conventional sample A had unsatisfactory peeling resistance (marked by a triangle). However, the conventional sample B had poor optical-magnetic properties. That is, only the inventive sample possessed both good peeling resistance and good optical-magnetic effects.

TABLE 1

|  | optical-magnetic recording medium of the present invention | |
|---|---|---|
| $\theta_k$(deg) at 830 nm | 0.5 | |
| C/N (dB) | 48.0 | |
| peeling resistance property (tape experiment) | ○ | |
|  | conventional optical-magnetic recording medium | |
|  | A | B |
| $\theta_k$(deg) at 830 nm | 0.5 | ~0 |
| C/N (db) | 47.0 | 22.0 |
| peeling resistance property (tape experiment) | △ | ○ |

An experiment was further conducted as follows. The optical-magnetic recording medium or layers of the present invention were formed on two disks made of PMMA and having respective guide grooves. The two disks formed as described above were bonded to each other. Films of the conventional optical-magnetic medium shown in FIG. 1A were formed on two disks made of PMMA and having guide grooves. The two disks were also bonded to each other. The C/N ratio of the disks formed as above changed in a condition of 50° C. and 90% RH, as time passes, as shown in FIG. 3. That is, conventional sample A failed prematurely and showed a somewhat lower C/N ratio.

As described above, according to the present invention, an enhancing film is formed by sputtering or evaporation conducted with the two materials, i.e., ZnS and a fluoride of an alkaline-earth metal together and simultaneously with each other. As a result, it becomes possible to obtain such an optical-magnetic recording medium that its Kerr rotation angle can be increased and that its layers are hard to be peeled off or broken.

What is claimed is:

1. An optical-magnetic recording medium, comprising:
   a recording layer comprising an amorphous alloy having a single axis anisotropy perpendicular to the surface of said recording layer, said amorphous alloy including a rare-earth metal-transition metal alloy;
   a support; and
   an enhancing layer between said recording layer and said support comprising ZnS and a fluoride of an alkaline-earth metal.

2. An optical-magnetic recording medium claimed in claim 1, wherein said enhancing layer is vapor deposited.

3. An optical-magnetic recording medium claimed in claim 1, wherein said enhancing layer is sputtered.

4. An optical-magnetic recording medium claimed in claim 1, wherein said fluoride of said alkaline-earth metal is MgF$_2$.

5. An optical-magnetic recording medium claimed in claim 1, further comprising a protective layer comprising ZnS and a fluoride of an alkaline-earth metal adjacent a side of said recording layer opposite said enhancing layer.

6. An optical-magnetic recording medium claimed in claim 1, wherein said support is grooved on a side of said enhancing layer.

7. An optical-magnetic recording medium claimed in claim 1, wherein said fluoride of said alkaline-earth metal is CaF$_2$.

8. An optical-magnetic recording medium claimed in claim 4, wherein said ZnS and CaF$_2$ are in an atomic ratio of approximately 3:1.

* * * * *